3,546,148
POLYURETHANE COMPOSITION AND SURFACING

James H. Diamond, St. Paul, and George E. Noponen, Birchwood, Minn., assignors to Minnesota Mining and Manufacturing Company, St. Paul, Minn., a corporation of Delaware
No Drawing. Filed Oct. 17, 1966, Ser. No. 586,958
Int. Cl. C08g 22/08
U.S. Cl. 260—18          4 Claims

ABSTRACT OF THE DISCLOSURE

Hard cured in situ polyurethane flooring formed by a reaction of polyisocyanate and polyol, containing at least 10% by weight polyalkyleneether polyol and at least 5% by weight of urethane grade castor oil or a castor oil polyol having an average of more than 4 hydroxy groups per molecule, the reaction mixture being substantially 100% solids, the polyol component being incompatible with water to the extent that addition thereto of less than 15% by weight water at 25° C. causes a distinct increase in turbidity, the surface having a room temperature Shore D hardness between about 30 and 90, the reaction mixture being curable into a noncellular solid even under conditions greater than about 40% relative humidity.

---

This invention relates to castable liquid room temperature curable polyurethane reaction mixtures, curable to a hard, tough, resilient state, and to surfacing, particularly flooring, formed therefrom.

Recently, cast-in-situ seamless polymeric flooring has come into wide usage. The use of monolithic surfaces avoids seams and irregularities which are unsightly and often unsanitary. Such floors have often been formed from polyurethane resins which are diluted with a volatile organic solvent to form compositions of an easily workable consistency. Polyurethane formulations of this type, known as ASTM type II, have often consisted of an isocyanate-terminated prepolymer diluted with a solvent which is applied to the floor substrate and allowed to moisture-cure with moisture from the atmosphere. Another type of polyurethane system involves the use of two solvent-thinned prepolymers, one of which is isocyanate-terminated and the other of which is hydroxyl-terminated. The two prepolymer solutions are mixed shortly before application, and the mixture cures by reaction of the remaining isocyanate groups with the hydroxyl groups, and with evaporation of the solvent. These latter systems avoid the deliberate introduction of urea linkages produced by the water reaction, but due to the high viscosity of the prepolymers, they cannot be easily worked and thus must be diluted with a volatile organic solvent. The presence in these systems of volatile organic solvents (usually 30 to 70% by weight) places serious limitations on the use of the materials and on the properties of the resultant flooring. Since the solvent must evaporate through the surface of the flooring, there is a tendency to form a dry layer or skin of material over the top which slows the rate of evaporation. An objectionable period of time for curing or drying, often involving a period of several days or even weeks, must be permitted in order to achieve a suitable hardness through the entire cross-section of the coating. It is thus necessary to limit the thickness of the coatings in order to minimize the length of time required for drying. Volatile solvents, moreover, create objectionable odors and explosive hazards, in addition to increasing the cost.

Two-part solvent-free systems for forming polyurethane elastomers based on polyether polyols are known; see, for example, U.S. Pat. No. 3,201,136 (Harrison et al.) issued Aug. 17, 1965. Polyester-based polyurethane systems provide many desirable properties as compared with polyester-based polyurethane systems, such as avoidance of hydrolyzable linkages, improved low temperature flexibility and lower viscosity reaction mixtures, and greater resistance of the polymer to biological attack by microorganisms. However, the formulation of systems of this type having hardness and other properties desired in flooring has not, to my knowledge, been heretofore accomplished. It is known that polyether-polyurethane products of increased hardness can be prepared from such systems by decreasing the molecular weight of the polyol component. However, the substitution of such polyols has, prior to this invention, been accompanied by a great increase in the moisture sensitivity of the system, such that the reaction mixtures could not be cured under ambient temperature and humidity conditions without unwanted bubble formation, or even foaming. Thus, it has not been believed possible to use such polyether-polyurethane based systems for such applications as rigid cast-in-situ floor coverings especially under high humidity conditions, i.e. relative humidities of 40 to 90% at 20 to 35° C.

The present invention provides two-part catalyzed substantially solvent-free polyurethane-forming reaction mixtures based on polyether polyols having reduced moisture sensitivity, which form a product of a hardness (i.e., having a Shore D hardness of 30 to 90), cut and scratch resistance, and other properties suitable for flooring, while remaining sufficiently elastic to adjust to the expansion, contraction, and shifting of substrate surfaces. Flooring or the like surfacing produced from the materials of this invention are hard, relatively stiff, and yet sufficiently resilient to withstand normal expansion, contraction or shifting of the flooring substrate without cracking. The surfacing self-adheres or bonds firmly to a variety of substrates such as wood, concrete, or old flooring tile, and this quality together with the resilience provides surfacing much more resistant to cracking and lifting off from the substrate than, for example, the more brittle epoxy coatings. The surfacing is abrasion-resistant and is sufficiently weather-resistant to withstand outdoor as well as indoor exposure, even in the northern temperate zone. Thus the surfacings of this invention are suitable for use not only in homes and commercial establishments, but also can be used as a surfacing on outdoor sun decks, patios, and porches. Flooring or similar surfacing can be formed from the reaction mixtures of this invention and can be formed in a single application to the desired thickness, generally about 20 to 250 mils (0.5 to 6 mm.).

The reaction mixtures of this invention are also suitable for use as casting resins in the formation of hard resilient castings, such as conduits, steering wheels, automotive lenses, etc.

Among the important properties desirable in flooring and similar surfacing material provided by the present invention, are hardness, resilience, resistance to staining, retention of properties with temperature changes, avoidance of moisture sensitivity of the reactants, and ease of application. To be easily applied by troweling, spraying, etc., the reaction mixture as applied should have a viscosity between 100 and 5,000 centipoises. No more than a very minor amount of volatile solvents, not exceeding about 5%, can be tolerated in the reaction mixture. Small amounts of such solvents are sometimes used as a vehicle for adding catalysts or other additives. Amounts less than 5% can be tolerated since they do not seriously affect the physical properties of the cured polymer and can escape slowly from the reaction mixture before or after cure, without causing bubbles, etc.

The desirable range of hardness of the cured resin includes materials having a 30 to 90 Shore D hardness at room temperature. Surfacing this hardness provides a high gloss and resistance to soiling, chemicals, and abrasion necessary in a useful flooring matrial. The preferred polymers retain their hardness at elevated temperatures, for example, 150° F., and retain their resilience at low temperatures. To achieve these properties, it is necessary that the polymer be highly crosslinked, although the properties are determined to some extent by the concentration of urethane linkages and of aromatic rings or cyclic structures. The polymers must be crosslinked to the extent that a calculated crosslink density of 3 to 25 crosslinks and preferably 10 to 20 per 10,000 atomic weight units of resin is provided. (This is equivalent to saying that there are 3 to 25 gram equivalent crosslinks per 10,000 grams of polymer or 3 to 25 lb. equivalent crosslinks per 10,000 pounds of polymer.) The calculated crosslink density is determined (not including fillers, plasticizers, etc.) by assuming that the polyurethane-forming reaction goes to 100% completion, and calculating the number of crosslinks produced in 10,000 atomic weight units by reaction of the reactive components in the mixture. This assumption is believed to be justified because the hardness of the polymers (as well as other properties) increases in direct relation to the increase in concentration of crosslinking groups in the reaction mixture. It has been found that reaction mixtures having a calculated crosslink density of less than 3 crosslinks per 10,000 atomic weight units result in coatings too thermoplastic or heat-softenable to be useful in flooring, while those having a calculated crosslink density above 25 tend to be excessively brittle and too easily shattered.

Crosslinking is produced in the polymers of this invention due to the presence in the reaction mixtures of reactive components having a functionality greater than 2, i.e. polyisocyanates with more than 2 isocyanate groups in the molecule and/or hydroxyl-containing molecules with more than 2 hydroxyl groups. Two functional groups in these "polyfunctional" molecules are involved in a linear polymer-forming or chain extension reaction while the functional groups in excess of two provide reactive sites for crosslinking or tying together of adjacent chains. In the case of the reaction mixtures of this invention, chain extension and crosslinking are achieved simultaneously by means of the same reaction mechanism.

For convenience it is preferred to carry out the calculation of crosslink density on the basis of 10,000 grams of polymer. Crosslink density provided by a polyol is thus calculated by multiplying (the number of gram-moles of polyol per 10,000 grams of combined polyol and polyisocyanate components) by (the number of hydroxyl groups contained in the polyol, minus 2). Similarly the (gram-moles of polyisocyanate per 10,000 grams polymer) multiplied by (the number of isocyanate groups contained in the polyisocyanate, minus 2) gives the number of crosslinks derived from the polyisocyanate. The sum of the figures calculated for all reactive components represents the total number of crosslinks. These calculations are shown in exemplary detail in Example I. To provide the minimum required degree of crosslinking, the reactive components in the reaction mixture should have a minimum average of at least about 2.1 reactive groups per molecule.

It is desirable that the polyol component have an average hydroxyl equivalent weight between about 130 and 400 (i.e. there is one —OH group per 130 to 400 atomic weight units of polyol). The average molecular weight of the polyol should be between about 250 and 3,000. Examples of the preferred polyether polyols are trimethylol propane-propylene oxide condensates and polybutylene ether polyols. Specifically, the preferred polyoxylalkylene polyols are condensates of propylene or butylene oxides with low molecular weight polyols, such as pentaerythritol, glycerol, sorbitol, sucrose, methyl glucoside, or propylene glycol; tri-, tetra-, penta-, hexa-methylene glycols; 1,3 butylene glycol, 2 ethylhexanediol 1,3; 2,2,4 trimethylpentanediol 1,3; trimethylolpropane; 1,2,6 hexanetriol; or phenyl diisopropanolamine. The polyalkylene ether polyols are advantageously mixed with castor oil or castor oil derivatives. Castor oil and derivatives thereof, such as hydroxylated esters of ricinoleic acid, in general reduce the moisture sensitivity of the reaction mixtures because they, as a general rule, have less moisture affinity (i.e. will dissolve less water) than polyether polyols. Low molecular weight polyols such as those noted above can also be added to the polyol component. Such blends should in any event, however, contain at least about 10% by weight and preferably at least 25% by weight of a polyether polyol in order to provide the above mentioned desirable properties, attributable to polyurethanes formed from polyether polyols, particularly low temperature physical properties of the surfacing. Surprisingly, it has been found that the addition of as little as 5% by weight of polyhydroxylated polyesters of fatty acid reduces the moisture sensitivity of polyether polyols so as to make useful polyols which in themselves are too moisture sensitive to be used as a major part of the polyol component. The polyols are preferably low viscosity liquids, although solutions of solid polyols in liquid polyols may be used if the viscosity of the reaction mixture upon adding the isocyanate component is sufficiently low.

The isocyanate component of the reaction mixture should have an average molecular weight of 110 to 3000 and may be an organic aromatic, aliphatic, cycloaliphatic, or heterocyclic polyisocyanates or mixtures thereof. However, aromatic isocyanates such as tolylene diisocyante, diphenylmethane, diisocyanate, xylylene diisocyanate, etc. are preferred. Tolylene diisocyanate, especially mixtures of the 2,4 and 2,6 isomers thereof, is particularly preferred in that it is readily reactable with the preferred polyols to give products having the desired properties, and is economically available commercially. Other suitable diisocyanates include m- or p-phenylene diisocyanate, 1.5 naphthalene diisocyanate, 4,4'-methylene bis (cyclohexyl isocyanate), hexamethylene diisocyanate, 3,3' dimethyl-4, 4' biphenyl diisocyanate, dimer acid diisocyanate (36 C atoms, molecular weight 600–DDI 1410), etc. Other useful polyisocyanates include liquid polyisocyanate compositions obtained by phosgenating the polyamines obtained by condensing formaldehyde with aromatic amines. Examples of polyisocyanates thus produced are polymethylene polyphenyl isocyanates.

The catalysts used to make the liquid reaction mixtures curable at room temperatures are preferably polyol soluble organic compounds of certain polyvalent metals, such as tin, lead, and mercury. As a practical consideration, organo-mercuric compounds, alone or combined with organic lead salts, are much preferred, as these appear to catalyze the reaction of polyols with polyisocyanates even in the presence of small amounts of moisture without undue side reactions, and thus avoid bubble formation. Examples of the preferred catalysts include phenyl mercuric oleate, phenyl mercuric acetate, mercuric octoate, mercuric naphthanate, mercuric oleate, lead octoate, lead oleate, and lead naphthanate. It is preferred to add such catalysts in small amounts ranging from 0.01 to 2% by weight of the reaction mixture. The catalytic activity of these catalysts is further enhanced by the addition of small amounts of basic reacting compounds, such as lead oxide, calcium octoate, etc., which do not in themselves display significant catalytic activity toward the isocyanate-hydroxyl reaction. Nonmetallic catalysts such as tertiary amines (e.g. triethylene diamine) may also be used. In the presence of such catalysts chain-extension and cross-linking of the low viscosity, relatively low average molecular weight reaction mixtures occur substantially simultaneously as the result of the same reaction mechanism.

It has been discovered further that resistance to staining and yellowing can be obtained by developing the necessary hardness through adequate crosslinking density and urethane linkage density in the polymer, while avoiding amines as sources of urea linkage.

Moisture sensitivity is a problem which has long plagued the application of two-part catalyzed urethane systems under ambient temperature and humidity conditions due to a tendency of the isocyanate radical to react with adventitious moisture present in the air, raw materials of the composition, or substrates such as wood or concrete. The problem is somewhat minimized by using substantially anhydrous reactants together with a catalyst which promotes preferably the urethane linkage forming reaction over the unwanted water reaction which produces urea linkages and $CO_2$ bubbles. However, a great number of the readily available polyols, e.g. the standard polypropylene oxide- or polyethylene oxide-based polyols, which would provide the above-noted average polyol equivalent weight of 130 to 400, have a tendency to absorb moisture readily in objectionable amounts, thus introducing bubbling into the system, even when the utmost care is used in the selection of a catalyst and maintenance of anhydrous conditions.

It has been found that polyols which provide both the crosslink density and the necessary lack of affinity for water generally have a carbon:oxygen atom ratio of greater than 3 and preferably greater than 4. Individual components of a polyol blend may have a ratio of less than 3, but the blend, being a combination of high-oxygen polyol and low-oxygen polyol, should have a ratio in excess of 3.

A simple test for water affinity of the polyol involves gradually adding water to a measured amount of polyol until no more water will dissolve therein, as evidenced by a distinct increase in turbidity of the mixture. This increase in turbidity is readily visible in the case of normally clear (transparent, usually colorless or amber) polyols, which become cloudy or translucent. Polyol mixtures which are not initially optically clear require the use of measuring devices, known to those skilled in the art, which permit measurement of a change in the light transmission and scattering of the light upon appearance therein of a separate aqueous phase in the form of insoluble droplets in the liquid polyol. This cloud point, or amount of water added to produce an increase in turbidity, gives a good approximation of the amount of water which is readily absorbed and/or dissolved in the polyol on exposure to the atmosphere or a substrate having some residual moisture. It has been found critical that the cloud point of the polyol component, including all additives to the reaction mixture (i.e. everything in the reaction mixture except for the polyisocyanate terminated prepolymers contained therein), be less than 3 parts water per 20 parts polyol at about 25° C. Polyol mixtures having this low affinity for moisture will avoid introduction of moisture into the reactive systems, thus providing a bubble-free cure. Mixtures of polyols meeting the above water affinity test with others not meeting the test, are useful so long as the resultant mixture passes the water affinity test.

It will be understood that a portion of the total polyol used may be added and prereacted with the isocyanate part of the reaction mixture to form an isocyanate "capped" or terminated material. Such pre-reaction improves the mixing ratio of the two-part system, for example, so that equal or nearly equal amounts of each part may be mixed together to form a properly proportioned reaction mixture. Since this pre-reaction can be carried out in a plant under carefully controlled conditions, and the polyols thus prereacted become capped with —NCO groups from the polyisocyanate, it is not critical that the portion of the polyol thus prereacted meet the above water affinity test. For example, 400 molecular weight polypropylene ether triol, which, in itself has excessive water affinity, can be added in small amounts to the polyisocyanate portion of the reaction mixture to form an —NCO terminated product which does not introduce moisture sensitivity into the system. The amount of polyol thus added to the isocyanate must be restricted in order to avoid excessive viscosity increase in the final reaction mixture.

Various fillers, pigments, antifoaming additives such as surfactants, and plasticizers, may be added to the reaction mixture in minor amounts. A particularly desirable plasticizer is sucrose acetate isobutyrate, which both reduces the moisture sensitivity and improves the flowability of the reaction mixture. The above-described water affinity test should be carried out on the polyol mixture, including any such polyol-soluble additives.

Where moist substrates are to be surfaced with the reaction mixtures of this invention, it is sometimes preferred to first apply a primer or sealer coating to seal off the substrate, thus preventing the moisture contained therein from entering the reaction mixture. For example, a thin layer of an elastomeric polyurethane material of the type disclosed in the above-mentioned Harrison et al. patent can be coated and curved on the substrate, and the hard surfacing of this invention applied thereover.

Attractive flooring can be formed from the compositions of this invention by the addition of pigments or particulate inserts thereto. For example, roofing granules, stone or plastic chips, etc. may be added to the resin or deposited on the coating while wet to provide decorative effects. Also abrasive particles and the like can be embedded in surfacing to provide antiskid characteristics.

It is preferred to use an NCO:OH ratio of about 1:1 rather than the large excess of NCO commonly used in urethane coatings in order to further minimize the isocyanate-water reaction. The preferred ratio is 0.9:1 to 1.3:1, although some deviation from these limits is permissible.

The invention will be further explained with reference to the accompanying examples in which all parts and percentages are given by weight, unless otherwise indicated.

EXAMPLE I

The following polyol mixture was mixed and heated one hour at 100–105° C. with agitation under a reduced pressure of 8–12 mm. Hg to remove any moisture present:

|  | Parts |
|---|---|
| TP 740 triol (condensate of trimethylol propane and propylene oxide, 732 M.W.) | 40.8 |
| Polycin 99F (hydroxylated castor oil derivative having an average of 5.1 hydroxy groups per molecule, molecular weight 1040, and a reported hydroxyl value of 290) | 46.0 |
| Pigment paste (40 parts TP 740 triol, 60 parts $TiO_2$) | 10.7 |

The mixture was cooled to 40° C. after which one part of a silicone surfactant and 1.5 parts of a 30% solution of mineral spirits of phenyl mercuric oleate, containing 10.8% mercury, were added and mixed under vacuum. The resulting mixture had a viscosity of 650 cps. at 25° C. and a specific gravity of 1.08. The unpigmented polyol mixture (without the surfactant) had a cloud point of 1.6 parts $H_2O$ per 20 parts polyol (8%).

An isocyanate component was prepared by mixing 71.5 parts toluene diisocyanate (80% 2,4- and 20% 2,6-isomer) with 11.5 parts TP 440 triol, a condensate of trimethylol propane and propylene oxide having a molecular weight of 426. The temperature was kept below 65° C. by stirring and external cooling. After 30 minutes an additional 17.0 parts of triol were added. The mixture was kept at 60–65° C. under 8–12 mm. Hg vacuum for 1 hour and then cooled to 50° C. The mixture had a viscosity of 2600 cps. at 25° C., a specific gravity of 1.20 and an isocyanate number of 163.

40.5 parts of the isocyanate component and 59.5 parts of the polyol component were mixed and coated onto a wooden flooring substrate to a thickness of ⅛″, using a notched trowel. The reaction mixture had a viscosity of about 1200 cps. The surfacing was sufficiently cured to permit walking thereon after 6 hours. After a two weeks cure under ambient conditions of 25° C. and 30–50% relative humidity, the polymer had the following properties:

Shore "D" hardness:
  75° F. _____ 72
  150° F. _____ 28
Tensile p.s.i., 75° F., 2 in. per min. _____ 4800
Percent elongation, 75° F., 2 in. per min. _____ 15
Gel time for 100 gms., min. _____ 7
Crosslinks per 10,000 gm. (calculated) _____ 15.3
Urethane linkages per 10,000 gm. (calculated) __ 35.0
Crosslink density was calculated as follows:

Part A had a viscosity at 25° C. of 920 cps. and a cloud point of 1 part $H_2O$ per 20 parts Part A. Part B had a viscosity of 3200 cps., and the resulting reaction mixture (47.5 parts of 4 Part A; 52.5 parts Part B) had a viscosity immediately after mixing of about 1800 cps. A ⅛ inch thick sheet of the reaction mixture was cured to give a polymer having the following properties:

Shore "D" hardness:
  75° F. _____ 76
  150° F. _____ 25
Tensile strength, p.s.i., 75° F., 2 in per min. _____ 5500
Percent elongation, 75° F., 2 in per min. _____ 10
Gel time for 100 gms. _____ 14
Crosslinks per 10,000 gm. (calculated) _____ 12
Urethane linkages per 10,000 gm. (calculated) ____ 37

| Component | Functionality | Crosslink sites, functionality minus 2 | Molecular weight | Grams | Gram moles | Crosslink) (gram moles |
|---|---|---|---|---|---|---|
| TP 740 | 3.0 | 1.0 | 732 | 26.8 | .0366 | .0366 |
| TP 440 | 3.0 | 1.0 | 426 | 11.5 | .0270 | .0270 |
| Polycin 99F | 5.1 | 3.1 | 1,040 | 27.4 | .0263 | .0815 |
| Toluene diisocyanates | 2.0 | 0 | 175 | 29.0 | .1660 | 0 |
| Total | | | | 94.7 | | 0.1451 |

NOTE: (0.1451 crosslinks)/94.7 grams times 10,000=15.3 gram-mole crosslinks per 10,000 grams polymer=15. crosslinks per 10,000 atomic weight units.

EXAMPLE II

The procedure of Example I was followed in preparing a polyol component and isocyanate component, but 35 parts of a 90% solution in toluene of sucrose acetate isobutyrate were added to the isocyanate component after cooling to 50° C. The mixture was maintained under a vacuum of 50–75 mm. for 20 minutes during which time it was cooled to 40° C. The mixture had a light amber color, a viscosity at 25° C. of 1600 cps., specific gravity of 1.18, and an isocyanate number of 219. A coating was formed by mixing 47.9 parts of this isocyanate component with 52.1 parts of the polyol component of Example I and applying to a substrate. The reaction mixture had a viscosity of about 800 cps. The surface was again sufficiently cured in about 6 hours to permit walking thereon. After two weeks cure under ambient conditions, the polymer had the following properties:

Shore "D" hardness:
  75° F. _____ 50
  150° F. _____ 23
Tensile p.s.i., 75° F., 2 in. per min. _____ 2300
Percent elongation, 75° F., 2 in. per min. _____ 60
Gel time for 100 gms. min. _____ 11
Crosslinks per 10,000 gm. (calculated) _____ 15.3
Urethane linkages per 10,000 gm. (calculated) __ 35.0

As seen from these properties the sucrose acetate isobutyrate has some plasticizing effect on the surfacing produced as well as reducing the viscosity of the isocyanate component and the reaction mixture.

EXAMPLE III

The following reactive components were prepared as in Example I:

Part A
                                                  Parts
Castor oil, urethane grade _____ 27.0
PeP 650 tetrol (condensate of pentaerythritol and
  propylene oxide, 600 M.W.) _____ 64.9
$TiO_2$ _____ 6.6
Phenyl mercuric oleate _____ 1.5

Part B
                                                  Parts
Toluene diisocyanate _____ 59.9
Tripropylene glycol _____ 4.8
Polyoxypropylene diol, 400 M.W. _____ 25.2
Castor oil, urethane grade _____ 10.1

What is claimed is:

1. A self-cured hard, tough, resilient, highly crosslinked nonporous polyurethane polymer, having a Shore D hardness at room temperature of about 30 to 90, said polymer being formed by chain extension and crosslinking in the same reaction mechanism at temperatures between about 0° C. and 70° C. within 48 hours from a reaction mixture essentially free of water and containing less than about 5% volatile organic solvents based on the weight of said reaction mixture, said reaction mixture comprising an organic polyisocyanate comprising a prepolymer of a polyalkyleneether polyol with an organic polyol component having a carbon:oxygen atom ratio of greater than 3 and containing, based on the weight of said polyol component, at least 10% by weight of a polyalkyleneether polyol and at least 5% by weight of urethane grade castor oil or a castor oil polyol having an average of more than 4 hydroxyl groups per molecule, said reaction mixture containing an average of at least 2.1 reactive groups ped molecule of reactive components, said polyol component having an average hydroxyl equivalent weight of about 130 to 400, said mixture containing —NCO and active hydrogen atoms in a ratio of about 0.9 to 1.3 —NCO groups for each active hydrogen atom and a catalyst for the reaction of said —NCO groups with said active hydrogen atoms, said mixture having a viscosity between about 100 and 5000 centipoises, said reaction mixture in the absence of any —NCO terminated materials therein undergoing a distant increase in turbidity upon addition thereto, based on the weight of said polyol component, of less than 15% by weight of water at 25° C., said reaction mixture being curable into a noncellular solid even under conditions of greater than at least about 40% relative humidity, said polymer having a crosslink density of 3 to 25 crosslinks per 10,000 atomic weight units of polymer.

2. A method for making durable cast-in-situ monolithic flooring surface comprising (a) providing a substantially clean, dry substrate, (b) forming a liquid reaction mixture by mixing an organic polyisocyanate comprising a prepolymer of a polyalkylene ether polyol with an organic polyol component having a carbon:oxygen atom ratio of greater than 3 and containinf, based on the weight of said polyol component, at least 10% by weight of a polyalkyleneether polyol and at least 5% by weight of urethane grade castor oil or a castor oil polyol having an average of more than 4 hydroxyl groups per molecule, said reaction mixture containing an average of at least 2.1 reactive groups per molecule of reactive components, said polyol component having an average hydroxyl equivalent weight of about 130 to 400, said mixture containing —NCO and active hydrogen atoms in a ratio of about 0.9 to 1.3 —NCO groups for each active hydrogen atom and a catalyst for the reaction of said —NCO groups with said active hydrogen atoms, said mixture being essentially free of water and containing less than about 5% volatile organic solvents based on the weight of said reaction mixture and having a viscosity between about 100 and 5000 centipoises, said reaction mixture in the absence of any —NCO terminated materials therein undergoing a distinct increase in turbidity upon the addition thereto, based on the weight of said polyol component, of less than 15% by weight of water at 25° C., said reaction mixture being curable into a noncellular solid even under conditions of greater than at least about 40% relative humidity, (c) coating said mixture on said substrate, and allowing said mixture to react by simultaneous chain extension and crosslinking from a liquid to a hard, tough, stiff, resilient, highly crosslinked, nonporous state having a Shore D hardness at room temperature of about 30 to 90, in a continuous reaction at temperatures between about 0° C. and 70° C. within 48 hours.

3. A method according to claim 2 wherein said castor oil polyol has a molecular weight of about 1040 and has an average of 5.1 hydroxy groups per molecule.

4. A method according to claim 2 wherein said reaction mixture upon reaction provides a polymer having 3 to 25 crosslinks per 10,000 atomic weight units of polymer.

References Cited

UNITED STATES PATENTS

| | | | |
|---|---|---|---|
| 3,395,108 | 7/1968 | Cobbledick et al. | 260—18 |
| 3,391,101 | 7/1968 | Kelley et al. | 260—77.5X |
| 3,202,620 | 8/1965 | Merton et al. | 260—77.5X |
| 3,345,311 | 10/1967 | Ehrlich et al. | 260—77.5X |
| 3,362,921 | 1/1968 | Ehrlich et al. | 260—18 |
| 3,201,136 | 8/1965 | Harrison et al. | 260—77.5X |
| 3,272,098 | 9/1966 | Buchholz et al. | 260—37X |

FOREIGN PATENTS

| | | |
|---|---|---|
| 720,528 | 10/1965 | Canada. |
| 673,263 | 10/1963 | Canada. |

OTHER REFERENCES

Carboline Product Data Sheet, "Carboline 1327," Carbobline Company, November 1965; 2 pp. (copy in 260–77.5A lit.).

Paint Oil and Chemical Review, Metz et al., vol 121, No. 8, April, 1958, pp. 6–12 (copy in library TP/934/P37).

HOSEA E. TAYLOR, Primary Examiner

C. W. IVY, Assistant Examiner

U.S. Cl. X.R.

117—104, 123, 148, 161; 260—9, 37, 77.5

UNITED STATES PATENT OFFICE
CERTIFICATE OF CORRECTION

Patent No. 3,546,148    Dated December 8, 1970

Inventor(s) James H. Diamond and George E. Noponen

It is certified that error appears in the above-identified patent and that said Letters Patent are hereby corrected as shown below:

Column 2, line 2, "Polyester" should read -- Polyether --

Column 5, line 50 after "polyisocyanate" insert -- and an isocyanate --.

Column 6, line 20 "curved" should read -- cured --.

Column 7 in the table, last column, delete the parenthese after "Crosslink" and insert a parentheses after "gram moles".

Column 7, line 27, in the "Note" below the table, "15." should read -- 15.3 --.

Column 8, line 47, "ped" should read -- per --.

line 56, "distant" should read -- distinct --.

line 70, "contaninf" should read -- containing

Signed and sealed this 1st day of June 1971.

(SEAL)
Attest:

EDWARD M. FLETCHER, JR.
Attesting Officer

WILLIAM E. SCHUYLER, JR
Commissioner of Patents